US 11,435,705 B2

United States Patent
Wee et al.

(10) Patent No.: US 11,435,705 B2
(45) Date of Patent: Sep. 6, 2022

(54) CONTROL OBJECTIVE INTEGRATION SYSTEM, CONTROL OBJECTIVE INTEGRATION METHOD AND CONTROL OBJECTIVE INTEGRATION PROGRAM

(71) Applicant: NEC Corporation, Tokyo (JP)

(72) Inventors: Werner Wee, Tokyo (JP); Yoshio Kameda, Tokyo (JP); Riki Eto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 944 days.

(21) Appl. No.: 16/307,531

(22) PCT Filed: Jun. 10, 2016

(86) PCT No.: PCT/JP2016/002811
§ 371 (c)(1),
(2) Date: Dec. 6, 2018

(87) PCT Pub. No.: WO2017/212508
PCT Pub. Date: Dec. 14, 2017

(65) Prior Publication Data
US 2019/0196419 A1 Jun. 27, 2019

(51) Int. Cl.
*G05B 13/02* (2006.01)
*G06N 20/20* (2019.01)

(52) U.S. Cl.
CPC ......... *G05B 13/028* (2013.01); *G05B 13/024* (2013.01); *G06N 20/20* (2019.01)

(58) Field of Classification Search
CPC ..... G05B 13/024; G05B 13/028; G05N 20/20
See application file for complete search history.

(56) References Cited

U.S. PATENT DOCUMENTS 6,021,369 A     2/2000  Kamihira et al.
11,074,497 B2 *  7/2021  Ascari ................... G06N 7/005
(Continued)

FOREIGN PATENT DOCUMENTS

EP    1420153 A2 *  5/2004  ............... F02C 9/00
JP    1158509 A     6/1989
(Continued)

OTHER PUBLICATIONS

Written Opinion issued by the International Bureau in corresponding International Application No. PCT/JP2016/002811, dated Sep. 6, 2016.
(Continued)

*Primary Examiner* — Vincent H Tran
(74) *Attorney, Agent, or Firm* — Sughrue Mion, PLLC

(57) ABSTRACT

An expert model unit 81 generates predicted expert control actions based on an expert model which is a machine learning model trained using data collected when an expert operated a plant which is a control target or a plant of the same or similar characteristics. A transformer 82 constructs metrics or error measures involving the predicted expert control actions from the expert model unit 81 as an objective term. A combiner 83 collects different objective terms from the transformer 82 and a learner which outputs machine-learning models as objective terms and computes an optimal set of weights or combinations of the objective terms to construct an aggregated cost function for use in an optimizer.

9 Claims, 3 Drawing Sheets

(56) References Cited

U.S. PATENT DOCUMENTS

| | | | | |
|---|---|---|---|---|
| 2008/0167820 A1* | 7/2008 | Oguchi | ............... | G08G 1/167 |
| | | | | 701/301 |
| 2010/0030521 A1* | 2/2010 | Akhrarov | ........... | G05B 23/0229 |
| | | | | 702/182 |
| 2013/0073113 A1* | 3/2013 | Wang | ................. | B60W 20/11 |
| | | | | 701/1 |
| 2016/0062353 A1* | 3/2016 | Lu | .................. | G05B 19/41885 |
| | | | | 700/31 |
| 2022/0135333 A1* | 5/2022 | Ericson | ............... | B65G 1/1376 |
| | | | | 700/218 |

FOREIGN PATENT DOCUMENTS

| | | |
|---|---|---|
| JP | H03-40002 A | 2/1991 |
| JP | 836560 A | 2/1996 |
| JP | 2014174993 A | 9/2014 |

OTHER PUBLICATIONS

International Search Report, issued by International Searching Authority in corresponding International Application No. PCT/JP2016/002811, dated Sep. 6, 2016.
Maciejowski, "Predictive Control with Constraints", Prentice Hall, 2001 (346 pages total).
Abbeel, et al., "Apprenticeship Learning via Inverse Reinforcement Learning", Computer Science Department, Stanford University, Stanford, CA, 2004 (8 pages total).
Ljung, "System Identification: Theory for the User", PTR Prentice Hall, Englewood Cliffs, N.J. (255 pages total).
Japanese Office Action for JP Application No. 2018-562278 dated Sep. 10, 2019 with English Translation.

* cited by examiner

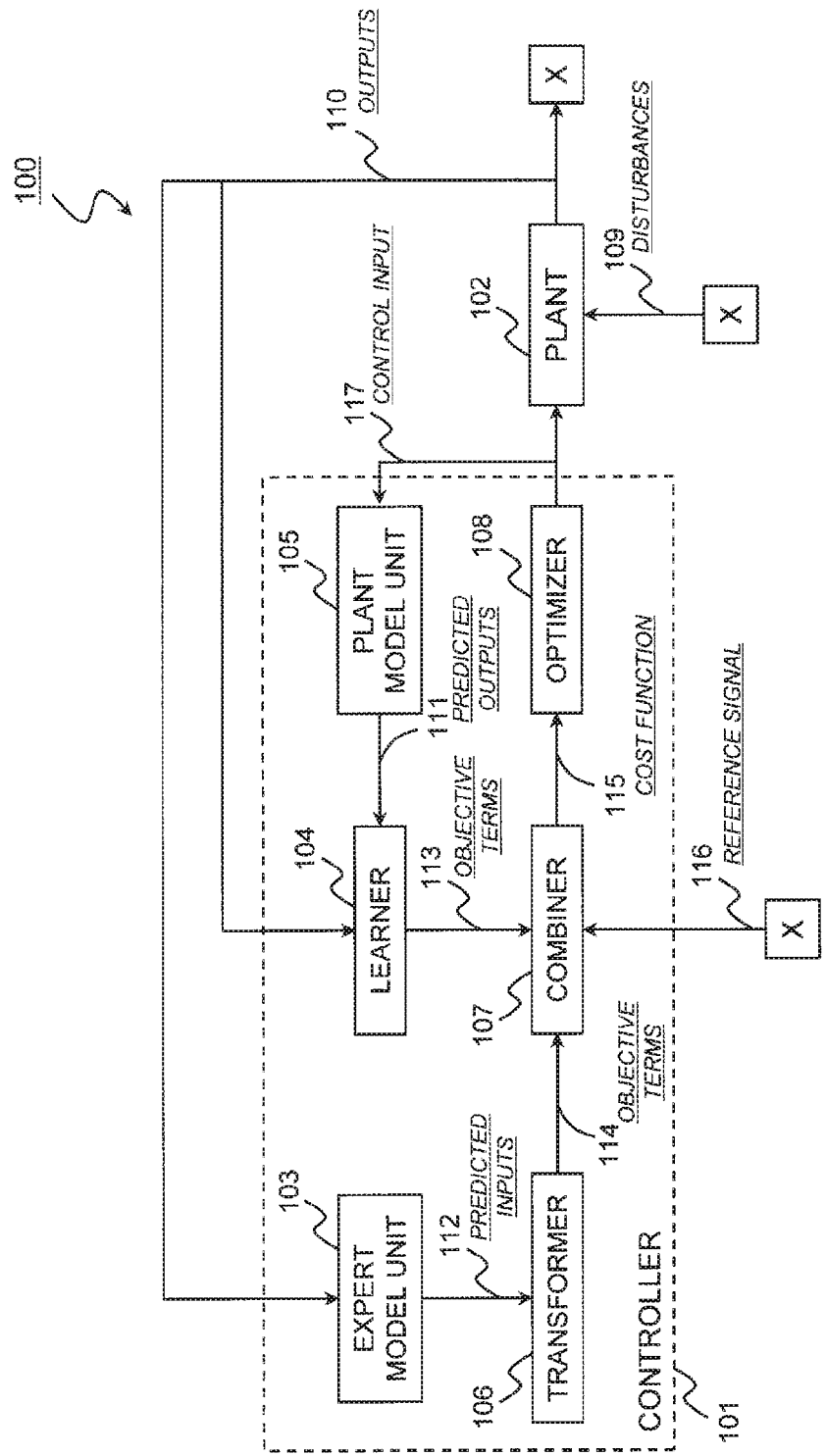
[Fig. 1]

[Fig. 2]
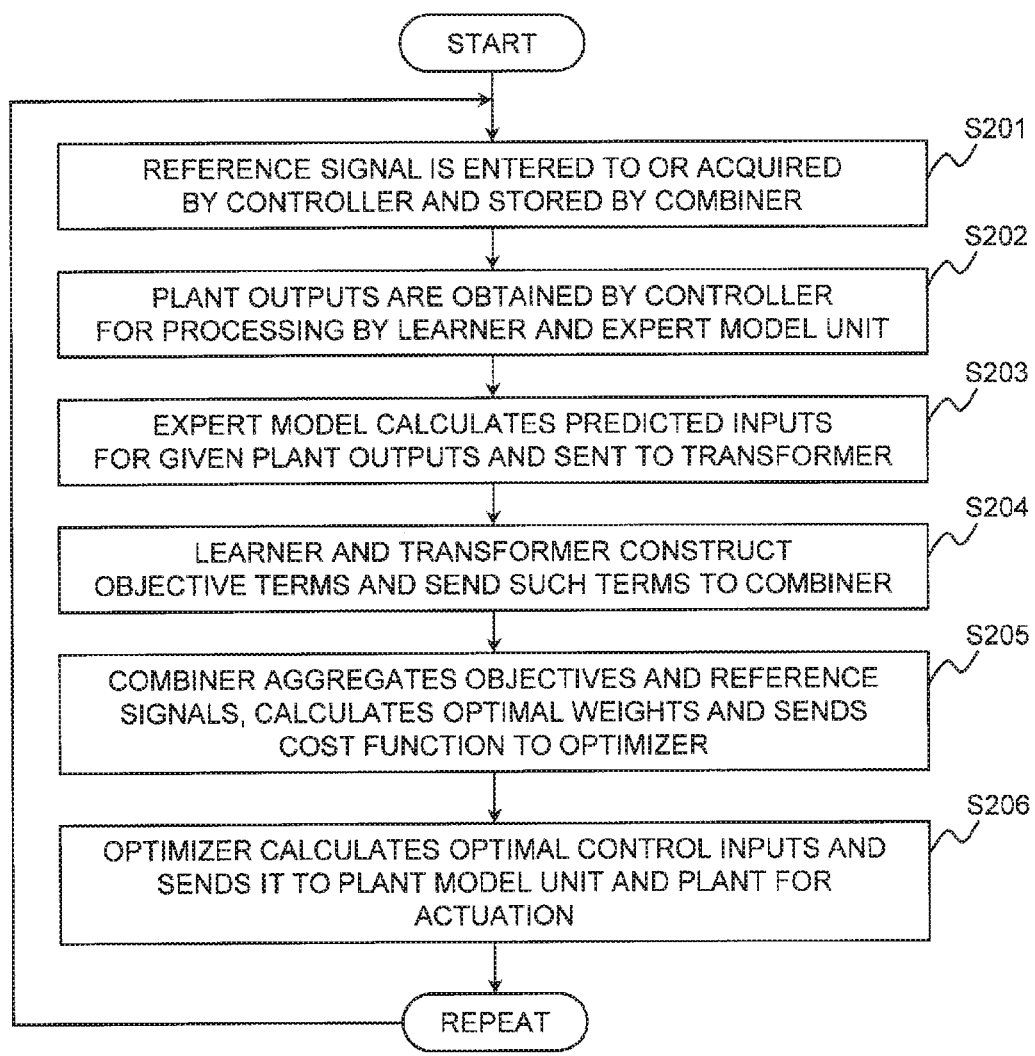

[Fig. 3]
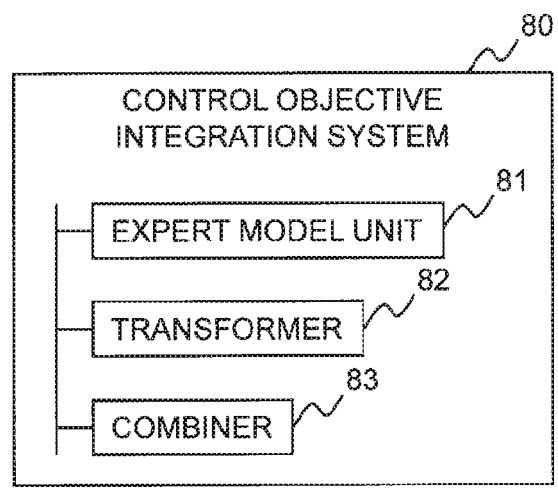

CONTROL OBJECTIVE INTEGRATION SYSTEM, CONTROL OBJECTIVE INTEGRATION METHOD AND CONTROL OBJECTIVE INTEGRATION PROGRAM

This application is a National Stage Entry of PCT/JP2016/002811 filed on Jun. 10, 2016, the contents of all of which are incorporated herein by reference, in their entirety.

TECHNICAL FIELD

The present invention relates to a control objective integration system, control objective integration method and control objective integration program for integrating explicit performance measure optimization with expert decision-making and control.

BACKGROUND ART

A main task in control systems is the optimization of certain aspects of controller performance relevant to the plant operator or user.

These aspects of controller performance are represented by different cost or objective function terms, which can be designed or constructed manually NPL1, e.g., by using expressions based on first principles or plant dynamics, or constructed automatically using data. i.e., by applying machine learning techniques on collected plant data for deriving predictive models. A similar plant control system, which employs an AI or machine learning system to derive advisories and correction factors to influence control decisions, is described in PLT 1.

Despite the possibility of constructing different objective terms based on mathematical principles and machine learning to capture desired performance measures for optimization, in practice, most performance measures or criteria have very high complexity.

Moreover, in many cases, such as when capturing expert behavior in a variety of situations, the performance measures have reward or objective terms that cannot be specified or explicitly defined, which hinder their direct use in the optimization for control of the plant.

Machine-learning models such as those proposed in NPL2 have been used to mimic how an expert will behave under a given situation.

Such expert models are trained from expert data, i.e., plant outputs and corresponding control inputs when the plant is controlled or operated by an expert.

These models can then be used to generate the control inputs that are predicted to be used by the expert at each instant.

CITATION LIST

Patent Literature

PTL 1: Japanese Patent Application Laid-Open No. 2014-174993

Non Patent Literature

NPL 1: J. M. Maciejowski. "Predictive Control with Constraints", Prentice Hall, 2001.
NPL 2: P. Abbeel and A. Y. Ng, "Apprenticeship Learning via Inverse Reinforcement Learning", 2004.
NPl. 3: L. Ljung, "System Identification—Theory for the User, 2nd edition", PTR Prentice Hall. Upper Saddle River, N.J., 1999

SUMMARY OF INVENTION

Technical Problem

As the expert model might be inherently in conflict with some explicit performance criteria, conventional approaches rely only on the use of either the explicit performance criteria or expert models, but not both. For example, the system described in PLT 1 calculates the gains and losses of each scenario, respectively.

However, reliance on only one source of control actions for reference can be associated to certain limitations.

For instance, using only the expert model may not provide sufficient insight into why the associated control actions were generated by such models in the first place.

Indeed, since the expert model generates inputs or behavior from a human operator or user, it is in general not interpretable.

In addition, it is possible that it does not contain or has not taken into account deep or complicated performance measures that a user or operator wants to address.

On the other hand, using only explicit performance criteria may not fully capture expert behavior and may result in control actions that are not natural in the sense of human operators.

The subject matter of the present invention is directed to realizing the above features in order to overcome, or at least reduce the effects of, one or more of the problems set forth above.

That is, it is an exemplary object of the present invention to provide a control objective integration system, control objective integration method and control objective integration program capable of balancing direct performance optimization and expert behavior and control.

Solution to Problem

A control objective integration system according to the present invention includes: an expert model unit which generates predicted expert control actions based on an expert model which is a machine learning model trained using data collected when an expert operated a plant which is a control target or a plant of the same or similar characteristics; a transformer which constructs metrics or error measures involving the predicted expert control actions from the expert model unit as an objective term: and a combiner which collects different objective terms from the transformer and a learner which outputs machine-learning models as objective terms and computes an optimal set of weights or combinations of the objective terms to construct an aggregated cost function for use in an optimizer.

A control objective integration method according to the present invention includes: generating predicted expert control actions based on an expert model which is a machine learning model trained using data collected when an expert operated a plant which is a control target or a plant of the same or similar characteristics; constructing metrics or error measures involving the predicted expert control actions based on the expert model as an objective term; and collecting different objective terms from a learner which outputs machine-learning models as objective terms and computing an optimal set of weights or combinations of the objective terms to construct an aggregated cost function for use in an optimizer.

A control objective integration program according to the present invention for causing a computer to execute: a process of generating predicted expert control actions based on an expert model which is a machine learning model trained using data collected when an expert operated a plant which is a control target or a plant of the same or similar characteristics; a process of constructing metrics or error measures involving the predicted expert control actions based on the expert model as an objective term: and a process of collecting different objective terms from a learner which outputs machine-learning models as objective terms and computing an optimal set of weights or combinations of the objective terms to construct an aggregated cost function for use in an optimizer.

Advantageous Effects of Invention

According to the present invention, control inputs based on an optimal combination of explicit performance measure optimization and predicted expert inputs can be calculated.

BRIEF DESCRIPTION OF DRAWINGS

FIG. 1 It depicts an explanatory diagram depicting the structure of exemplary embodiment of a control integration system according to the present invention.

FIG. 2 It depicts a flowchart depicting an operation example of the integration system in this exemplary embodiment.

FIG. 3 It depicts a block diagram illustrating an outline of a control integration system according to the present invention.

DESCRIPTION OF EMBODIMENTS

The following describes an exemplary embodiment of the present invention with reference to drawings. The present invention relates to a method and system for integrating explicit performance measure optimization with expert decision-making and control. The preferred and alternative embodiments, and other aspects of subject matter of the present disclosure will be best understood with reference to a detailed description of specific embodiments, which follows, when read in conjunction with the accompanying drawings.

The following discussion of the embodiments of the present disclosure directed to a method and system for constructing a control objective integrating predicted inputs from an expert model and cost function terms based on explicit performance criteria is merely exemplary in nature, and is in no way intended to limit the disclosure or its applications or uses.

FIG. 1 is an explanatory diagram depicting the structure of an exemplary embodiment of the objective integration system according to the present invention.

The objective integration system 100 according to the present exemplary embodiment includes a controller 101 and a plant 102. According to the present exemplary embodiment, the controller 101 controls the plant 102. The controller 101 comprises of an expert model unit 103, a learner 104, a plant model unit 105, a transformer 106, a combiner 107, and an optimizer 108.

The plant 102 sends plant outputs 110 to the controller 101. The plant outputs 110 are acquired by the sensor (not shown) of the plant 102. The plant 102 may acquire disturbances 109 as the plant outputs 110.

The expert model unit 103 generates predicted expert control actions or inputs 112 based on an expert model by using the plant outputs 110. The expert model is a machine-learning model constructed from expert data, which can belong to a class of predictive models such as Hidden Markov Models or Markov Decision Processes.

The expert model is trained by using data collected when an expert operated the plant 102 which is the control target. The expert model may be trained by using data collected when an expert operated a plant of the same or similar (a same type of) characteristics as the plant 102. For example, in the case where the plant 102 is a vehicle, the expert model can be an expert driver model, implicitly describing reward or performance measures associated with expert driving. Further, it is possible for the plant 102 (vehicle) to receive over-the-air updates (data streams or learned terms) from other plants (vehicles) with the same characteristics.

The expert model can be constructed in advance using machine learning techniques such as inverse reinforcement learning (with Markov decision processes) as described in NPL2 or by Bayesian methods (with other predictive models). The expert model outputs, i.e., the predicted inputs 112, are used by a transformer 106.

The transformer 106 constructs metrics or error measures involving the predicted expert control actions (predicted inputs 112) from the expert model unit 103 as an objective term 114. That is, the transformer 106 constructs an error measure or metric involving the predicted inputs 112. This error measure is an objective term 114 that is an output of the transformer 106. The transformer 106 sends the objective term 114 to the combiner 107 for collection and processing.

In detail, the transformer 106 generates objective terms 114 using a kind of expert system which employs conditional statements from a knowledge database and/or uses machine learning techniques. For instance, based on the current and expected plant situation, the transformer 106 chooses the metric or error measures, or cost function most appropriate for measuring the deviation between the expert inputs as predicted by the expert model unit 103 and the optimal inputs desired by a user.

The transformer 106 also chooses the appropriate metric or error measure for each of the inputs, as different inputs may have different units or properties that may require special attention.

As a specific example, consider an automated driving or driving assistance system where the control inputs are longitudinal acceleration and steering wheel angle. At each time, the transformer 106 receives data related to the physical conditions of the car and its surroundings, such as speed, lane width, and traffic situation. The transformer 106 processes such information, and chooses appropriate metrics or error measures for the control inputs, e.g., Euclidean metric or Huber loss function by using a knowledge database.

That is, the objective terms 114 are terms representing an evaluation obtained as a result of the control input (predicted expert control actions) by the expert, such as comfort, and can be considered as a performance measure related to human sensitivity. For instance, the objective terms 114 are represented by the formula to return the high performance measure as the size of the roll (the output from the device) is small. The desired state of the plant 102 is inputted to the transformer 106 from the objective integration system outside.

The plant model unit 105 generates predicted outputs 111 based on a plant model that describes the dynamics of the plant. The predicted outputs 111 depend on the current or initial control input 117 from the optimizer 108. The plant model can be constructed in advance using techniques from the field of system identification. Such methods are described in NPL3, for example.

The plant model unit 105 feeds the predicted outputs 111 into the learner 104. The predicted outputs 111 are used as training data along with plant outputs 110 by the learner 104.

The learner 104 outputs machine-learning models for each controllable variable as objective terms 113 by using machine learning techniques applied on the collected data (specifically, control input 117, predicted outputs 111 and plant outputs 110). Specifically, the learner 104 constructs objective terms 113 by methods which can be based on existing machine learning techniques. In particular, advanced Bayesian techniques and interpretable machine learning models can be used.

The learner 104 learns a performance measure, such as energy efficiency, as an objective terms 113, which has been learned using the predicted outputs 11 calculated using the plant model. That is, the objective terms 113 can be said to be constructed terms which are mechanical in nature from the output data of the plant 102 and plant model unit 105. For instance, the objective terms 113 is represented by the formula to calculate the energy efficiency according to the rotational speed of the engine (control input).

The combiner 107 receives the objective terms 113 and the objective terms 114. In other words, the objective terms 113 and the objective terms 114 are collected by the combiner 107. The combiner 107 uses approaches for multi-objective optimization to determine appropriate weights for balancing the objective terms (specifically, objective terms 113 and the objective terms 114).

The combiner 107 constructs a cost function 115 involving the objectives based on the calculated weighting combination. At that time, the combiner 107 may receive a reference signal 116 to construct the cost function 115. The reference signal 116 includes target values to be used for information about the user's preferences. For example, in the case that the combiner 107 constructs the cost function 115 related to automated driving, the reference signal 116 may be road signs and GPS signals. The reference signal 116 also may be the desired position (via GPS), velocity, fuel consumption, and travel time. The combiner 107 sends the cost function 115 to an optimizer 108.

In this way, the combiner 107 collects different classes of objective terms. Specifically, the combiner 107 collects two different types of objective terms generated using different principles. One is the class of terms (the objective terms 113) that represent quantities or measures that are technical in nature or are in accordance with mechanical principles, e.g., fuel consumption, which can be obtained by learning from data collected by the plant 102. The other class is composed of terms (the objective terms 114) that act as performance measure related to human skills, sensitivity or preferences, which employ predicted expert inputs obtained from the expert model 103 trained using observed behavior of experts. Then, the combiner 107 computes an optimal set of weights or combinations of the terms to construct an aggregated cost function 115 for use in an optimizer 108.

For instance, if the objective terms 113 is represented by Formula1 and the objective terms 114 is represented by Formula2, the combiner 107 may calculate the weight A1, A2 (i.e. A1=0.4, A2=0.6) of each formula, and determine the cost function L=A1*Fomula 1+A2*Formula2 by multiplying the weight to each formula.

The optimizer 108 optimizes the cost function 115 using linear, quadratic or nonlinear programming methods. Specifically, the optimizer 108 uses the cost function 115 to computes for an optimal control input 117, which is used for actuating the plant 102.

The expert model unit 103, the learner 104, the plant model unit 105, the transformer 106, the combiner 107, and an optimizer 108 are realized by a CPU of a computer operating according to a program (an objective integration program). For example, the program may be stored in a storage unit (not shown) in the objective integration system 100, with the CPU reading the program and, according to the program, operating as the expert model unit 103, the learner 104, the plant model unit 105, the transformer 106, the combiner 107, and an optimizer 108. The functions in the objective integration system of the present invention may be provided by SaaS (Software as a Service) type.

The expert model unit 103, the learner 104, the plant model unit 105, the transformer 106, the combiner 107, and an optimizer 108 may each be realized by dedicated hardware. Alternatively, the expert model unit 103, the learner 104, the plant model unit 105, the transformer 106, the combiner 107, and an optimizer 108 may each be realized by generic or specific circuitry. Here, the generic or specific circuitry may be constituted by a single chip or may be composed of a plurality of chips connected via a bus. Furthermore, if some or all of the constituent elements of each device is realized by a plurality of information processing devices or circuits, the plurality of devices or circuits and the like may be centrally located, or may be distributed. The devices and circuits, etc. may be realized as a form to be connected respectively via a communication network such as a client and server system, cloud computing system, etc.

The following describes an example of the objective integration system in this exemplary embodiment. FIG. 2 is a flowchart depicting an operation example of the objective integration system in this exemplary embodiment. Now consider a semi or fully automated driving scenario where the controlled variables are the longitudinal acceleration and the steering wheel angle.

First, at S201, reference signals 116 are entered into or acquired by the controller 101 and stored specifically by the combiner 107. Based on the current or initial control input 117, at S202, plant outputs 110 are obtained by the controller 101 for processing by the learner 104 and the expert model unit 103.

At S203, the expert model unit 103 calculates predicted inputs 112 for the given plant outputs 110 and sent to the transformer 106. At S204, the learner 104 and transformer 106 simultaneously construct objective terms 113 and objective terms 114 and send such terms to the combiner 107.

In one embodiment, the transformer 106 employs a knowledge database which, depending on the conflict between different error measures or the presence of outliers in the data, will be used to choose between, say, the Euclidean metric (or its square), or a robust error measure such as the Huber loss function. The criteria used for such rules can be based on the values of the objective terms at the previously computed input, which can tell us which of the terms tend to dominate in the optimization.

Moreover, aside from the normalization or standardization usually required for the different controlled variable units, the transformer 106 can employ a more appropriate steering wheel metric depending for example on characteristics of the driving situation, e.g., vehicle speed, road curvature and lane width.

The transformer 106 can also employ machine learning algorithms to detect and learn which measures of acceleration or steering wheel movement are more appropriate or comfortable for the users depending on some sensor data or user input.

The combiner 107 then collects the objective terms and uses multiobjective optimization techniques to calculate optimal combinations or weights of the objective terms 113 and objective terms 114 to construct a combined cost function 115, at S205.

In the automated driving example, the combiner 107 can employ Pareto-based multiobjective optimization approaches considering fuel efficiency and distance to target to obtain a number of Pareto-optimal solutions from which the combiner 107 can then choose the appropriate solution.

In particular, the set of Pareto-optimal solutions can be used to determine the relevant features or dominating solutions.

Finally, at S206, the optimizer 108 calculates optimal control input 117 for actuation in the plant 102 and for computation again of predicted outputs in the plant model unit 105.

As described above, according to the present exemplary embodiment, the expert model unit 103 generates predicted expert control actions based on an expert model, the transformer 106 constructs metrics or error measures involving the predicted expert control actions from the expert model unit 103 as an objective term 114, and the combiner 107 collects different objective terms from the transformer 106 and a learner 104 and computes an optimal set of weights or combinations of the objective terms to construct an aggregated cost function 115 for use in the optimizer 108. Thus, control inputs based on an optimal combination of explicit performance measure optimization and predicted expert inputs can be calculated.

Moreover, it is also important to find appropriate weights that determine the relative importance between the objective terms and a measure involving the expert predictions. According to the present exemplary embodiment, the combiner 107 employs (Pareto-based) multiobjective optimization approaches. Thus, appropriate weights can be found.

The outline of the present invention will be described below by way of example. FIG. 3 is a block diagram illustrating the outline of an control integration system according to the present invention. The control integration system 80 according to the present invention includes: an expert model unit 81 (e.g. the expert model unit 103) which generates predicted expert control actions based on an expert model which is a machine learning model trained using data collected when an expert operated a plant (e.g. the plant 102) which is a control target or a plant of the same or similar characteristics; a transformer 82 (e.g. the transformer 106) which constructs metrics or error measures involving the predicted expert control actions (e.g. predicted inputs 112) from the expert model unit 81 as an objective term (e.g. objective terms 114); and a combiner 83 (e.g. the combiner 107) which collects different objective terms (e.g. objective terms 113 and objective terms 114) from the transformer 82 and a learner (e.g. the learner 104) which outputs machine-learning models as objective terms (e.g. objective terms 113) and computes an optimal set of weights or combinations of the objective terms to construct an aggregated cost function (e.g. the cost function 115) for use in an optimizer (e.g. optimizer 108).

With the above structure, control inputs based on an optimal combination of explicit performance measure optimization and predicted expert inputs can be calculated.

Based on the current and expected plant situation, the transformer 82 may choose the metric or error measures for measuring the deviation between the expert inputs as predicted by the expert model unit and the optimal inputs desired by a user.

The combiner 83 may collect two different classes of objective terms (e.g. objective terms 113 and objective terms 114) generated using different principles.

Specifically, one class of objective terms may represent quantities or measures that are mechanical in nature, the other class of objective terms may act as performance measures related to human skills, sensitivity or preferences.

The combiner 83 may employ Pareto-based multiobjective optimization approaches.

The foregoing description of preferred and alternative embodiments is not intended to limit or restrict the scope or applicability of the inventive concepts of the present disclosure. One skilled in the art will readily recognize from such discussion and from the accompanying drawings and claims that various changes, modifications and variations can be made therein without departing from the spirit and scope of the disclosure as defined in the following claims.

REFERENCE SIGNS LIST

100 Objective integration system
101 Controller
102 Plant
103 Expert model unit
104 Learner
105 Plant model unit
106 Transformer
107 Combiner
108 Optimizer

The invention claimed is:

1. A control objective integration system comprising:
a hardware including a processor;
an expert model unit, implemented at least by the processor, which generates predicted expert control actions based on an expert model which is a machine learning model trained using data collected when an expert operated a plant which is a control target or a plant of the same or similar characteristics;
a transformer, implemented at least by the processor, which constructs metrics or error measures involving the predicted expert control actions from the expert model unit as an objective term; and
a combiner, implemented at least by the processor, which collects different objective terms from the transformer and a learner which outputs machine-learning models as objective terms and computes an optimal set of weights or combinations of the objective terms to construct an aggregated cost function for use in an optimizer.

2. The control objective integration system according to claim 1,
wherein based on the current and expected plant situation, the transformer chooses the metric or error measures for measuring the deviation between the expert inputs as predicted by the expert model unit and the optimal inputs desired by a user.

3. The control objective integration system according to claim 1,
wherein the combiner collects two different classes of objective terms generated using different principles.

4. The control objective integration system according to claim 3, wherein one class of objective terms represents quantities or measures that are mechanical in nature, the other class of objective terms acts as performance measures related to human skills, sensitivity or preferences.

5. The control objective integration system according to claim 1,
wherein the combiner employs Pareto-based multiobjective optimization approaches.

6. A control objective integration method comprising:
generating predicted expert control actions based on an expert model which is a machine learning model trained using data collected when an expert operated a plant which is a control target or a plant of the same or similar characteristics;
constructing metrics or error measures involving the predicted expert control actions based on the expert model as an objective term; and
collecting different objective terms from a learner which outputs machine-learning models as objective terms and computing an optimal set of weights or combinations of the objective terms to construct an aggregated cost function for use in an optimizer.

7. The control objective integration method according to claim 6,
based on the current and expected plant situation, choosing the metric or error measures for measuring the deviation between the expert inputs as predicted-by and the optimal inputs desired by a user.

8. A non-transitory computer readable information recording medium storing a control objective integration program, when executed by a processor, which performs a method for:
generating predicted expert control actions based on an expert model which is a machine learning model trained using data collected when an expert operated a plant which is a control target or a plant of the same or similar characteristics;
constructing metrics or error measures involving the predicted expert control actions based on the expert model as an objective term; and
of collecting different objective terms from a learner which outputs machine-learning models as objective terms and computing an optimal set of weights or combinations of the objective terms to construct an aggregated cost function for use in an optimizer.

9. The non-transitory computer-readable recording medium according to claim 8, based on the current and expected plant situation, choosing the metric or error measures for measuring the deviation between the expert inputs as predicted and the optimal inputs desired by a user.

* * * * *